(12) United States Patent
Potteck

(10) Patent No.: US 6,324,475 B1
(45) Date of Patent: Nov. 27, 2001

(54) METHOD FOR IDENTIFYING IN A PRE-ESTABLISHED CATALOGUE STARS DETECTED BY A STAR SENSOR

(75) Inventor: Serge Potteck, Toulouse (FR)

(73) Assignee: Centre National d'Etudes Spatiales (FR)

( * ) Notice: Subject to any disclaimer, the term of this patent is extended or adjusted under 35 U.S.C. 154(b) by 0 days.

(21) Appl. No.: 09/367,428

(22) PCT Filed: Feb. 13, 1998

(86) PCT No.: PCT/FR98/00277

§ 371 Date: Aug. 12, 1999

§ 102(e) Date: Aug. 12, 1999

(87) PCT Pub. No.: WO98/36373

PCT Pub. Date: Aug. 20, 1998

(30) Foreign Application Priority Data

Feb. 13, 1997 (FR) .................................................. 97 01668

(51) Int. Cl.[7] ........................................................ G06F 7/00
(52) U.S. Cl. ........................ 701/222; 250/203.1; 244/3.18
(58) Field of Search ................................... 701/222, 223, 701/226; 250/203.1; 244/3.18, 164, 171

(56) References Cited

U.S. PATENT DOCUMENTS 5,508,932 * 4/1996 Achkar et al. ........................ 701/226

OTHER PUBLICATIONS

Groth, E.J., "A Pattern–Matching Algorithm for Two–Dimensional Coordinate Lists", Astronomical Journal, May 1986, USA, vol. 91, No. 5, ISSN 0004–6256, pp. 1244–1248, XP002044901.*

Scholl, M.S., "Six–Feature Star–Pattern Identification Algorithm", Applied Optics, vol. 33, No. 20, Jul. 10, 1994, pp. 4459–4464, XP000455186.*

"Autonomous Star Tracker Development", R.W.H. van Bezooijen, Proceedings of the Automatic Control In Aerospace IFAC Symposium, pp. 513–518, Tsukuba, Sep. 7, 1992.

* cited by examiner

Primary Examiner—William A. Cuchlinski, Jr.
Assistant Examiner—Edward Pipala
(74) Attorney, Agent, or Firm—Lerner, David, Littenberg, Krumholz & Mentlik, LLP

(57) ABSTRACT

The invention concerns the identification of stars. It consists in selecting "detected stars" among the sensed stars; coupling the detected stars; selecting all or part of the doublets of the catalogue which are most likely to have been present in the visual field of the sensor, the likely doublets and their stars constituting a set D; pairing stars of D with detected stars; and supplying all or part of the paired couples of stars to a processing system. The method is characterized in that it comprises at least the consolidating classification of the set D stars and at least a step using this classification for reducing the number of stars to be paired and/or for carrying out the pairing, and/or for selecting the paired couples. The invention is applicable in particular for determining the attitude of an aircraft or submarine.

28 Claims, 4 Drawing Sheets

FIG_1
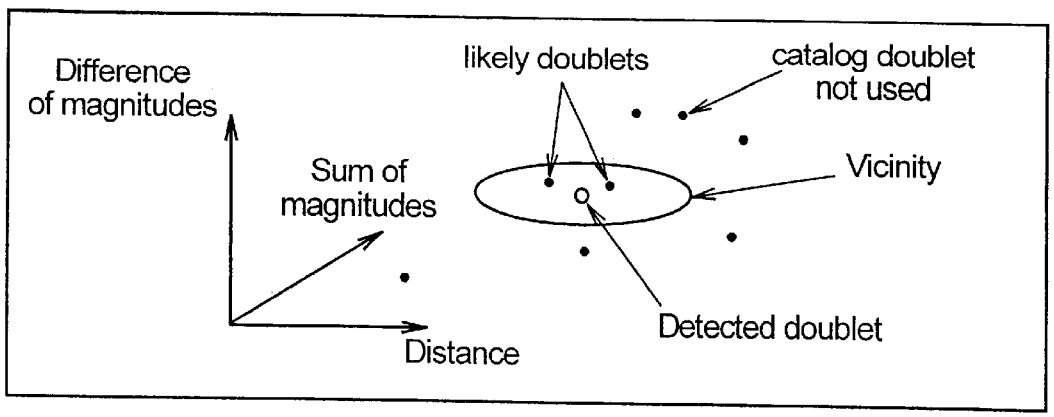
FIG_2
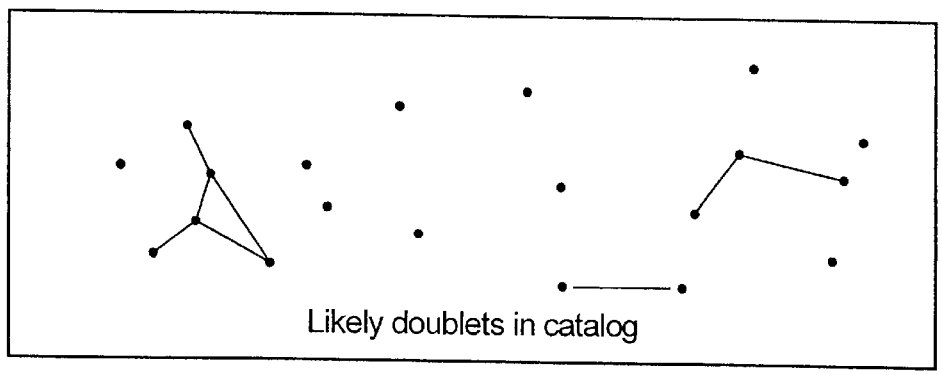
Likely doublets in catalog
FIG_3
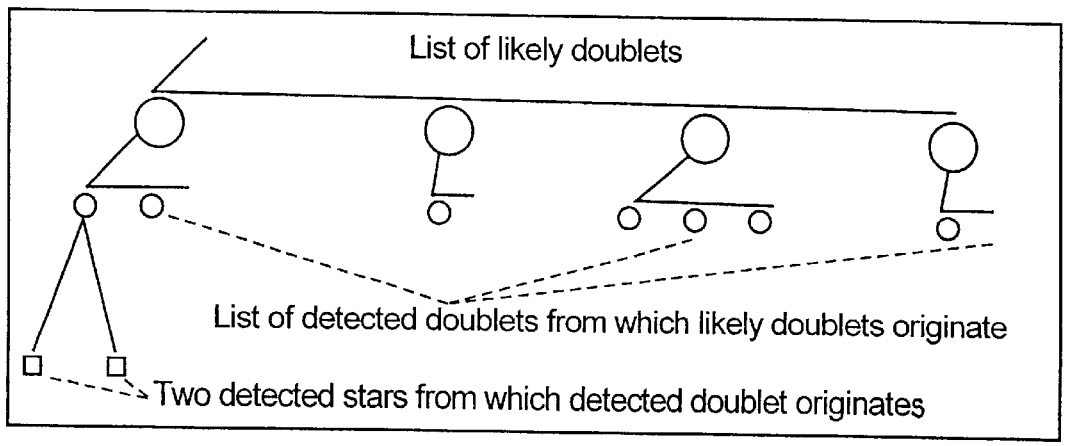

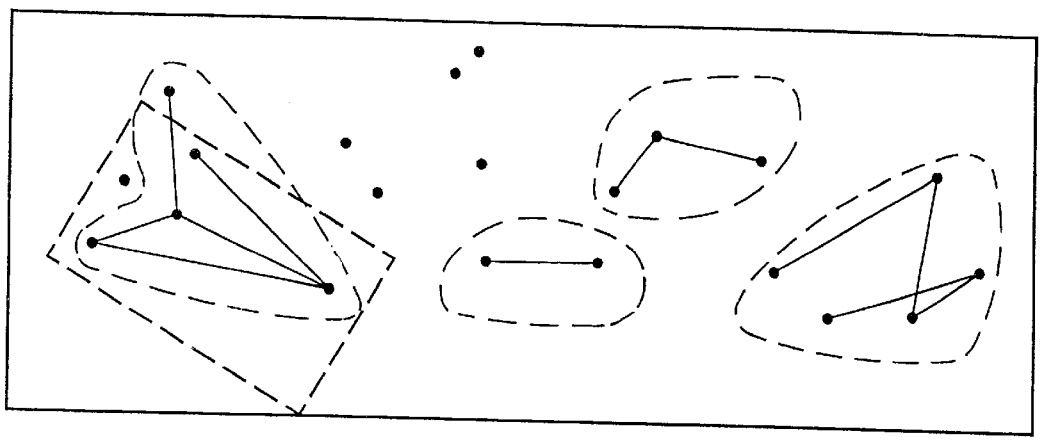
FIG_4
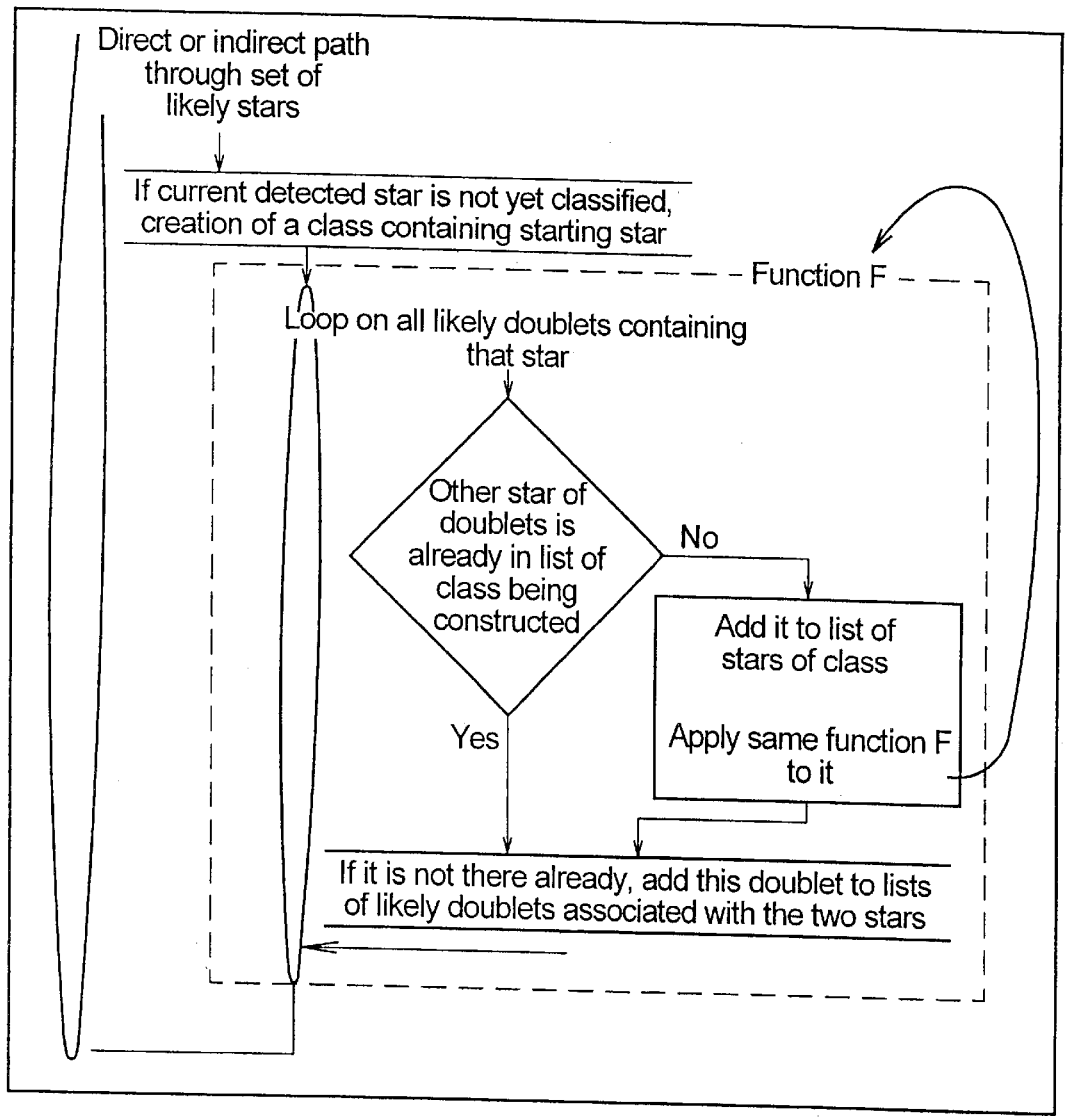
FIG_5

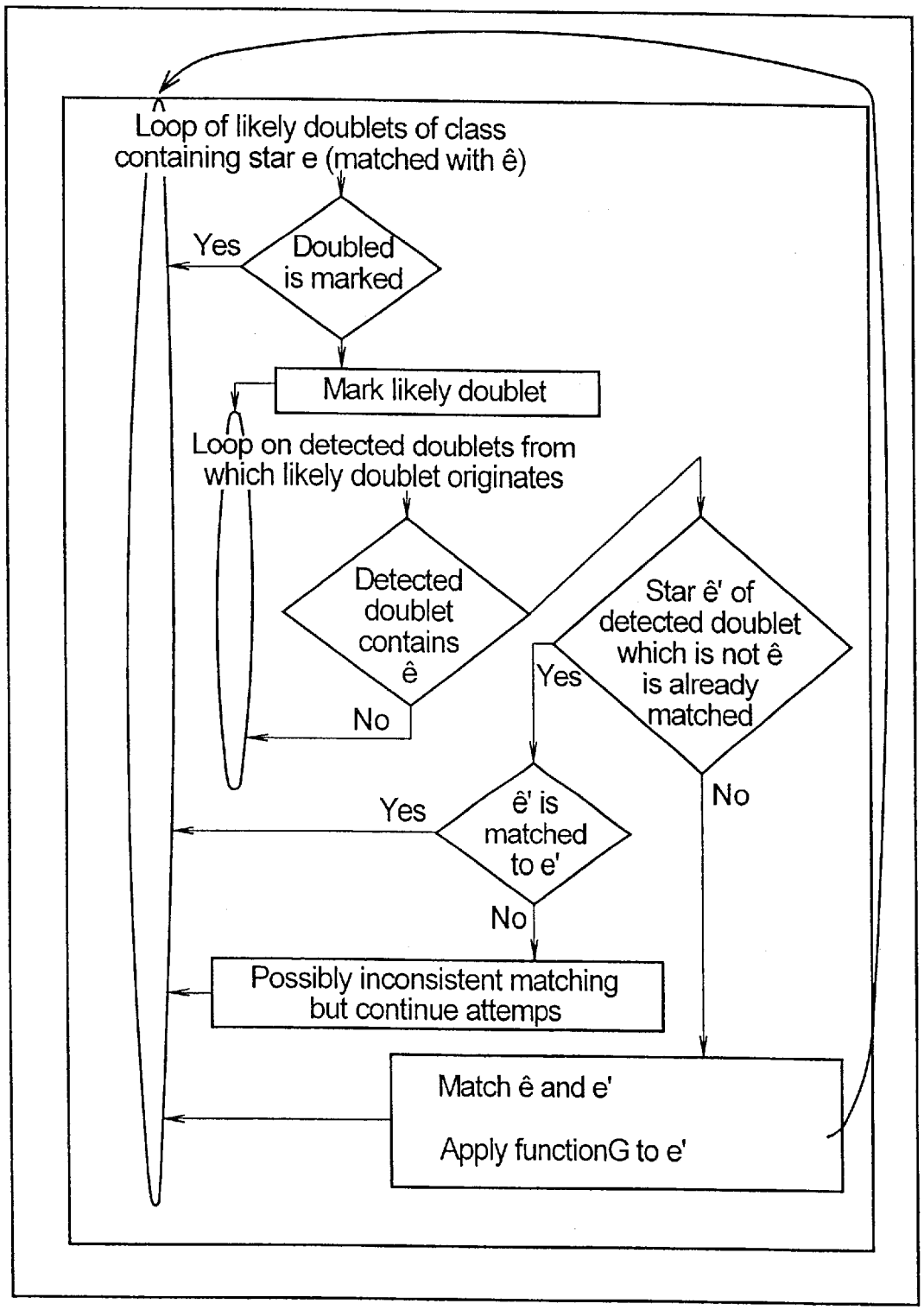
FIG_6

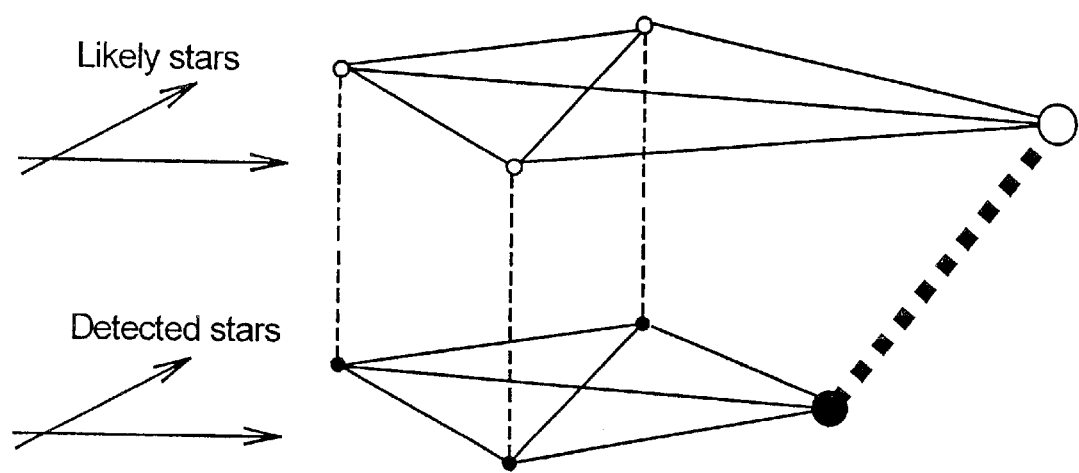
FIG_7

METHOD FOR IDENTIFYING IN A PRE-ESTABLISHED CATALOGUE STARS DETECTED BY A STAR SENSOR

BACKGROUND OF THE INVENTION

1. Field of the Invention

The invention concerns a method for recognizing in a pre-established catalog of stars in the sky some or all of the stars detected by a star sensor, for a processing system using star recognition.

2. Background of the Invention

If recognition is successful, it is possible, for example, to estimate the attitude of the frame of reference of the star sensor or, using additional means, to refine an estimate, from which it is then possible to work back to the attitude of the vehicle, for example an aircraft or a submarine, on which the star sensor is mounted.

Prior art star recognition methods include methods in which:

- some stars are selected from the sensed stars, the stars selected in this way being referred to hereinafter as "detected" stars;
- the detected stars are combined two by two into "detected doublets";
- "likely doublets" are identified, i.e. doublets of stars from the catalog which are in the vicinity of the detected doublets in a common characterization space;
- pairs are created each comprising a star of a likely doublet and a detected star, and
- at least one list of such pairs is supplied to the processing system.

One such process is described in the paper "Autonomous Star Tracker Development" by R. W. H. van Bezooijen published in the proceedings of the Automatic Control In Aerospace IFAC Symposium, Tsukuba, Sep. 7, 1992.

SUMMARY OF THE INVENTION

The invention aims to improve the success rate of of prior art recognition methods and to minimize the calculation time.

The present invention achieves this by means of a method as defined hereinabove and characterized in that:

- the stars from the catalog are grouped into classes, two stars being considered to belong to the same class if and only if they are coincident or there is a path which links them, a path being a series of likely doublets such that any pair of consecutive doublets of the series has at least one star in common,
- lists are established class by class by matching some or all of the stars of a class with detected stars to constitute a list, and
- at least one of these lists is selected and supplied to the processing system.

The invention therefore creates a set of subcatalogs such that the stars actually present in the field of view have an infinitesimal chance of being divided between more than one subcatalog, the stars in which have a particularly high chance of having been present in the field of view, those which are too weakly linked having been eliminated by a process of purging.

The method of the invention makes the matches on the basis of very small purged subcatalogs and usually this more than adequately compensates the increase in the computation time caused by the multiplicity of subcatalogs.

The invention also consists in a matching method such that, for equivalent performance of the star sensor, the recognition success rate is greatly improved compared to prior art methods.

BRIEF DESCRIPTION OF THE DRAWINGS

Embodiments of the method of the invention are described hereinafter and the description and the figures show other advantageous features of the embodiments.

In the figures:

FIG. 1 is a diagram representing detected and likely doublets in a characterization space, FIG. 2 is a diagram showing likely doublets against a representation of the sky, FIG. 3 is a diagram of a list of likely doublets formed from a list of detected doublets, FIG. 4 is a diagram of the sky showing the field of view of the sensor and, for various classes, the paths that link the stars of each class, FIG. 5 is a diagram representing a classification method, FIG. 6 is a diagram representing a matching method, and FIG. 7 is a diagram of a method for eliminating aberrant pairs of matched stars.

DETAILED DESCRIPTION OF THE PREFERRED EMBODIMENTS

A step preceding the method of the invention is to construct, from the unprocessed measurements of the sensor, a set of stars assumed to have been present at the time of the measurement.

This step produces a list of "sensed" stars, which are often described by their magnitude and their position in a frame of reference (for example that of the sensor).

The next step, i.e. the first step of the method of the invention, consists in retaining only some of the "sensed" stars for further processing. It is proposed, for example, to retain only the K stars with the lowest magnitudes (i.e. the brightest ones), K being an integer chosen in advance.

The stars selected in this way are called "detected stars".

The second step of the method is to couple the detected stars two by two to form "detected doublets".

The third step of the method, which can be carried out while processing some or all of the set of detected doublets, seeks to draw up a list of some or all "likely doublets", i.e. doublets from the star catalog which have a good chance of having been present in the field of view during the measurement.

For the purposes of this step, if it does not exist already, a "catalog" of doublets containing only doublets having a sufficiently small angular distance for their two stars feasibly to have been present simultaneously in the field of view of the sensor can be created from a catalog of stars indicating their characteristics. The doublets can be classified in order of increasing or decreasing angular distance, which enables them to be found more easily afterwards. The likely doublets are selected in a doublet characterizing space which is compatible with the information supplied by the catalog and also with the measurements supplied by the sensor.

The doublet space is a three-dimensional space, for example, whose three axes respectively correspond to the angular distance between the two stars constituting the doublet, the absolute value of the difference in their magnitudes and the sum of their magnitudes (FIG. 1), and a doublet from the catalog is deemed to be a "likely" doublet when, within this space, it is within the "vicinity" of the detected doublet.

The benefit of working with the difference between the magnitudes is that errors in the magnitudes in the form of skew are eliminated automatically.

The vicinity is defined by an ellipsoid or a parallelepiped, for example, and can be centered on the detected doublet.

During this step, the only doublets which can be collected are those in certain areas of the sky which the sensor is known to have a great chance of seeing. This can be achieved by dynamically creating, prior to this step, a subcatalog of stars and/or doublets replacing the complete catalogs. It can also be achieved by performing a test on processing a doublet when working through all the doublets corresponding to the stars from the catalog of stars or doublets.

FIG. 2 is a diagram of the sky showing an example of likely doublets from the catalog.

The set of likely doublets is designated "D". A set of corresponding likely stars is implicitly associated with it.

If necessary, each "likely" doublet is associated with a list LDD of "detected" doublets from which it was obtained, ensuring that it is possible to work back to the detected stars from the detected doublets (FIG. 3).

If, during processing, the number of likely doublets threatens to exceed the capacity of the means implementing the method, construction of the list can be stopped, for example, or likely doublets already identified can be destroyed. It can be advantageous to choose them from the list at random.

Another step of the invention groups the stars from set D into classes.

A path h is defined as a series $\delta_0, \ldots, \delta_{N-1}$ of elements of set D such that any pair of consecutive doublets in the series has at least one common star.

In the set E of stars, the following relationship of equivalence is defined:

$$\varepsilon_1 \equiv \varepsilon_2 \text{ (star } \varepsilon_1 \text{ is related to star } \varepsilon_2\text{)} \Leftrightarrow$$

$$\varepsilon_1 = \varepsilon_2, \text{ or there is a path } h_{1,2} \text{ made up of elements}$$

$$\text{from set } D \text{ linking } \varepsilon_1 \text{ to } \varepsilon_2$$

The above relationship of equivalence defines classes of equivalences in the star catalog. Hereinafter a "class" is the set of stars corresponding to a class of equivalence and/or the set of corresponding likely doublets. In FIG. 4, which shows stars from the catalog, the classes are identified by a curved loop.

FIG. 5 shows a classification method in which, starting with a star from one of the likely doublets and which constitutes the first star of a new class, stars which are linked by at least one path to the first star are progressively added to the new class.

For example, "function F" is applied to the first star: a loop is done on the likely doublets containing the first star, which is now the "current star". For each doublet, if the star of the doublet which is not the current star is already present in the class, the next iteration of the loop is performed. Otherwise, the star which is not the current star is added to the class and function F is applied to the new star, which is then the current star. This process continues in this way, recursively, applying function F to any star that is not yet in the class before continuing with application of function F to the current star.

The recursive process has to be stopped. To achieve this, the stars already processed can be "marked" so that they are not processed again. The doublets can also be marked so that they are not processed a second time from the other end.

When the recursive process is stopped, i.e. when the current class has been entirely constructed, the next class is constructed around a star that has not previously been attached to a class, and that class is constructed as just explained. The classification process stops when all the original stars (or all the likely doublets) have been processed.

Regardless of the option chosen, whether a class is constructed as:

a list of objects pointing toward the stars from the catalog or reproducing those stars, a list of objects pointing toward the complete list of likely doublets or reproducing those doublets (in which case a class is represented by the list of the doublets containing its stars), or the stars belonging to the various classes in the star catalog (respectively the doublets in the catalog of doublets) are merely linked together, it can be beneficial to retain both the list of likely doublets and the list of likely stars. This retains all the information needed for possible subsequent operations of purging, further classification and/or matching. Such operations can additionally be simplified if the links between the likely stars and the likely doublets to which they belong have been made material.

"Virtual classification" is also possible. In contrast to the preceding "material classification" (consisting, for example, in creating lists or placing pointers in computer data structures), virtual classification consists in assigning to each star certain characteristics of the class of equivalence to which it belongs on the basis of likely doublets defined already. These characteristics can be the number of likely stars and/or the number of likely doublets of the group.

The above recursive process enables virtual classification without list creation provided that it is applied twice, the first time to evaluate the characteristics of the class of equivalence and the second time to assign those characteristics to each star of the group.

One advantageous option of the method of the invention is to purge some or all of the likely stars. This consists in eliminating some likely stars and the likely doublets containing them permanently from the list(s) in which they appear, on the basis of a criterion.

This criterion consists, for example, in rejecting a star that is too close to another star in the direction of a norm defined in a doublet characterization space or rejecting a star if the number of links by likely doublets between that star and the other stars is below a threshold. Provided that classification has been done beforehand, the threshold can depend on the characteristics of the last class to which the star concerned belonged (an important characteristic being the number of stars in that class).

One pass of the purging process applies this criterion to all the stars of a group of stars to be processed (depending on the situation and the time, to all the likely stars or to some of them, those corresponding to a class, for example).

Consecutive passes can be based on the same criterion, there being a predefined number of passes or the process continuing until no star is eliminated. If no star is eliminated in a pass, there is no point in executing the subsequent passes of the same episode.

A succession of passes is called a purging "episode".

The purging process as a whole is made up of a plurality of successions of episodes, respectively applied to various groups of stars made up of the complete set of likely stars, a class or the residue of stars that previously formed a class. Each episode can be defined by a different purging criterion. The number of episodes can be reduced to zero, however, in which case there is no purging.

Any purging pass applied to a class is likely not only to reduce the size of that class by eliminating one or more stars but also to convert the structure of likely stars and likely doublets that constituted the class into a structure no longer having the properties of a class of equivalence. In this case, if the characteristics of the classes are allowed for in the criterion of a subsequent pass, the characteristics of the last class to which the star in question belonged could be used. If the number of stars of the last class is allowed for in the criterion, the criterion could nevertheless use, instead of the number of stars in the original class, that number reduced by one each time a star is eliminated.

Classification and purging can advantageously be articulated to refine the purging criterion using the characteristics of the group of stars (a class of equivalence which, as far as the method is concerned, is not yet a class) to which the star concerned is linked by likely doublets.

Classification can be done after some episodes.

The succession of episodes and classifications is constructed from one or more "episode tables" like that shown in Table I.

In the table, the two columns on the left show the classifications and the episodes that are performed in succession (from top to bottom and from left to right). Each episode is characterized by the number of passes and the criterion (in this example the criterion is the minimum number of likely doublets containing a star that is retained, as a function of the number of stars in the group).

TABLE I

| Classification | Episode | Passes | Number of stars in group or class | | | | | |
|---|---|---|---|---|---|---|---|---|
| | | | 2 | 3 | 4 | 5 | 6 | 7 | 8 and above |
| x | Episode 1 | 25 | Not dependent on size of group stars included in a single doublet are eliminated | | | | | |
| • | Episode 2 | 1 | 1 | 2 | 3 | 2 | 2 | 3 | 4 |
| X | Episode 3 | 2 | 1 | 2 | 3 | 2 | 3 | 4 | 5 |
| •/ | | | | | | | | | |

In the first episode, all the stars linked to a single other star are eliminated. There is therefore no point in performing a classification beforehand (symbol x).

If there is a classification after an episode (symbol • in the table), there is no point in performing it if the group of stars produced by said episode has remained unchanged through the most recent episodes applied to the stars of the group since their last classification.

If classification is not required after an episode (symbol x in the table), or if classification has been done but has produced only one class, then the next episode from the episode table is applied to that group of stars.

There are two options if classification has been done and has produced more than one class. One option is to apply the next episode from the current episode table to each of the classes produced. The classification is then designated "non-initializing". The other option is "initializing" classification whereby for each of the classes produced the succession of episodes is resumed at the first episode of a new episode table (symbol •/in the table). The new episode table can be identical to the preceding one. It can also depend on the number of episodes or classifications to which the stars of the classes have already been subjected, for example.

The last episode of any episode table is necessarily followed by classification of the stars produced by the last episode (with the possible exception of the group of stars remaining unchanged through the most recent episodes applied to the stars of the groups since their last classification). If the last classification is initializing and if more than one class is produced, then purging resumes at the first episode of a new episode table. If only one class is produced, or if the classification is non-initializing, then purging stops for the corresponding stars and the classes produced (of which there may be only one) are definitive.

In the above purging process, all the likely stars are subjected to the episodes before the first classification. After the first classification, or any subsequent classification, starting with the next episode, the method of choosing which has just been explained, various ways of processing the classes produced can be used, and possibly combined:

The consecutive episodes of the episode table that are not separated by a classification but terminate in a classification, for example the series of episodes 1 and 2 in Table I, are applied to the stars of all the classes from the preceding episode. Each time the criterion is based on the characteristics of the class to which the star concerned belongs, these characteristics possibly being partially updated when eliminating stars, as mentioned above. In practice, the processing can be done class by class or on the entire set of stars provided that a virtual classification has been done previously. All the likely stars that have been spared are then grouped together for the next classification to be applied to them.

The procedure is as before, but the groups from each initial class are classified separately and the classes are collected as and when they are produced or grouped at the end.

The classes are processed recursively, until the end of the purging and classification process.

Function R is applied: After each classification the classes from the preceding classification are processed in succession and independently. If that classification was initializing and produced more than one class, then the first episode of a new episode table is applied to those classes. If it was the first classification the first episode of the new episode table is applied to each class. otherwise the next episode in the current episode table is applied.

For each class the episode just described is followed by the supplemental episodes preceding the next classification (there may be none), after which said classification is applied to the stars produced.

Function R is applied to each of the classes produced in succession, even before processing the classes produced by the preceding classification.

In each branch this recursive process leads either to the elimination of all the stars or to the production of definitive classes that merely have to be collected, as and when they are produced if the process is sequential (it can also be parallelized).

In some implementations these three processes require that, as the purging of a group of stars proceeds, attributes of the group are filled out describing its current purging point (episode table reference, current episode reference within the table and current path reference within the current episode). The first two of the above attributes may have to be retained at the time of the classification in order to be able to determine which is the next episode to be applied to the resulting classes.

There are two possibilities in all the preceding cases concerning purging, if the purging criterion involves the characteristics of the group of stars containing the star being processed (for example, the number of stars and/or the number of links between the star being processed and the other stars of the class). The first possibility is to begin with a first step of marking the likely stars and the likely doublets to be eliminated in the group of stars subjected to the first pass. The criterion is then calculated each time on the basis of the initial characteristics of the group, the eliminations being done in the various lists in a second step. The second possibility is for the elimination to be done in passing, which has the drawback that the characteristics of the group can change as the successive calculations of the purging criteria proceed (following the elimination of elements).

In all cases the classes for which the number of stars is too low can be eliminated during any of the classification operations.

There is generally a small number of classes at the end of the classification-purging process, even if a large total number of classes was produced in the intermediate steps.

If the number and the volume of the classes exceed the capacities of the means implementing the method, classes that have already been constructed can be chosen from the ones containing the least stars and destroyed.

After classification and purging, the various classes constitute as many subcatalogs. These have the following properties. On the one hand, there is little chance that the stars present in the field of view of the sensor during the measurement are divided between more than one class. A good number of the detected doublets linking the detected stars have led to correct selection of likely doublets between the correct likely stars (not yet known). The many links between those stars will have prevented them from being separated between more than one class during classification and purging. Also, in the class actually containing the stars present in the field of view during the measurement, the bad stars have a good chance of being eliminated by the purging process.

The classes can therefore be processed independently, and each time the aim is to pair the detected stars with the likely stars of the class concerned. Any conventional method or combination of conventional methods can be used for this purpose. A "list of pairs of matched stars" is produced for each class processed in this way.

The next step of the process is therefore to pair the likely stars (of each class in succession) with the detected stars from the star measurement. It is feasible to pair the same detected star with more than one likely star, either provisionally or permanently if the user system can exploit this information and resolve the ambiguity at this level. In the remainder of the description, it is nevertheless implicitly considered that each likely star of the class and each detected star are included in at most one -pair of matched stars.

A matching method is proposed here which exploits links between likely doublets and detected doublets.

A loop is performed on the likely stars to be matched, either on all the likely stars or class by class, as appropriate.

For the likely star $e_p$ corresponding to the iteration concerned:

the list "LDD" of doublets detected during the measurement by the star sensor is used (and created at this level if it has not been created beforehand; this list is the origin for the likely doublets containing the star), the detected star $\hat{e}_d$ which is encountered most often in the list of detected doublets is chosen.

If there is any indeterminacy, the next likely star is processed.

If the detected star has already been matched with a star of the current class, the next star from the class can be processed, possibly after marking that class as "inconsistent".

A criterion for accepting the chosen detected star can be used. For example, the chosen detected star $\hat{e}_d$ is rejected if the difference between the number of encounters with the second detected star encountered most often in list LDD and the number of encounters with $\hat{e}_d$ is less than a limiting value, possibly depending on the number of stars in the class.

If the criterion is satisfied, or if there is no criterion, $\hat{e}_d$ is matched to $e_p$: the current star is considered to be the star from the catalog corresponding to $\hat{e}_d$. The pair $\{\hat{e}_d, e_p\}$ is called a "pair of matched stars".

The next likely star is then processed.

The purging process just described is one such process that can be used before classification and purging, without loss of performance if there is no purging or if purging is not very severe.

When the process is applied after classification, the pairs of matched stars created in passing can be added to the "list of pairs of matched stars" corresponding to the classes as and when they are created. Otherwise, the lists are made up after classification.

With some matching processes, the attempt at matching can be abandoned when a sufficient number of matched pairs is deemed to be available. It is then advantageous to process the likely stars in decreasing order of the confidence that can be put in them. Decreasing order of the number of likely doublets in which the likely stars processed are present is recommended in the case of the method just described.

An a priori confidence value and/or an a posteriori confidence value corresponding to each class can be calculated and used.

The aim is to calculate the degree of confidence that can be put in the fact that each of the classes corresponds to what was in the field of view of the sensor during the measurement, before and after the matching process.

The confidence values can depend on the following terms:

The number $N_j$ of stars in the class. This number can be operative through the hyperbolic tangent term of the number of stars multiplied by a constant, the product being raised to some power.

The average rate of connection $T_j$ of the class, defined as the number of likely doublets of the class divided by $N_j(N_j-1)/2$ (the maximum number of doublets allowing for the number of stars). This number can be raised to one of its powers.

The a posteriori confidence value, so called because it is calculated after matching, can rely on other terms such as the matched star rate (which is the ratio of the number of matched stars in the class to the total number of stars in the class), or a value characterizing inconsistencies during matching of the stars of the class.

The a priori and a posteriori confidence values can include a term which is the product of the terms described above respectively concerning them.

Various processes for rejecting unreliable classes can also be applied. For example, classes whose a priori confidence value is below a predetermined threshold can be rejected permanently. After pairing, classes whose a posteriori confidence value is below a predetermined threshold, or those which caused inconsistencies during matching, can be rejected.

Various modes of selecting results to be transmitted by the present method to the user system can be envisaged:

The present method processes the classes in decreasing order of their a priori confidence index and stops processing when one or more matched lists have been obtained that are considered to be sufficiently reliable because their confidence index exceeds a threshold value. The possible saving in calculation time is increased if the matching is done for a class immediately after it is created once and for all within the classification-purging process. In this case, the classes are processed at each classification level in the order of their index of confidence.

The matching can be done for all the classes and those for which the a posteriori confidence value is the highest retained. A predefined number of lists of pairs of matched stars can be selected, although this number is limited to the number of classes produced.

All the lists of pairs of matched stars corresponding to all the classes can be transmitted to the system using the recognition.

When more than one list of pairs of matched stars are sent to the user system, each of the lists is advantageously accompanied by its a priori confidence criterion.

Once a list of pairs of matched stars has been obtained by any method, aberrant pairs of matched stars can be eliminated. Here the following method is proposed: if a match is wrong, the doublets linking the likely star of the pair to the likely stars of the other pairs will often be different from the corresponding detected doublets. In FIG. 7, the match at the righthand end is wrong.

Each pair of matched stars is processed in succession, referred to herein as the "current pair". In the case of each of the other pairs, the difference between the detected doublet and the likely doublet separating the pair considered from the current pair is measured in a doublet characterization space. Let Nr be the number of these other pairs such that the difference is greater than a threshold value that can depend on the characteristics of the doublets, for example the average of their distances between stars. The current pair is rejected if Nr exceeds a limit which can depend on the number of matched pairs.

The axes of the doublet characterization space can be the distance between stars, the sum of the magnitudes, the difference between the magnitudes (not the absolute value of this difference this time). When the space is such that the order in which the two stars are taken is important, the process begins with the stars of a matched pair for the detected doublets and for the likely doublet.

Because the criteria are applied on the basis of the initial characteristics of the lists of pairs, this process can advantageously be performed in two passes: the first to mark the pairs to be eliminated and the second to eliminate them from the lists.

The method of eliminating aberrant pairs can be applied before or after eliminating lists on the basis [lacuna]

With regard to the performance of this complete process, certain stars can cause problems in the starting catalog which can systematically lead to bad results. They can be eliminated from the catalog.

After the (optional) choice by the system using the recognition of a list of pairs of matched stars from those provided by the present process, the pairs of matched stars are used to indicate the attitude or improve the estimate.

The position of the detected stars on the matrix of the sensor makes it possible to work back toward the direction of the stars in the frame of reference of the sensor. Also, the direction of the corresponding likely stars in the frame of reference tied to the catalog is known. If at least two matched pairs are available, the orientation of the frame of reference of the sensor in the frame of reference of the catalog can then be estimated, for example using a least squares algorithm. Because the orientation of the frame of reference of the sensor in the frame of reference of the satellite is known, by changing the frame of reference it is thereafter possible to work back to the attitude of the satellite in the frame of reference of the catalog and from there to a frame of reference tied to Earth, for example.

In the foregoing description, it has largely been a question of lists of objects (stars, doublets, etc). This is a matter of the convention chosen to describe the process. The concept of a "list" reflects the existence of means for materializing the links between a series of objects enabling the objects to be found in order to subject them to processing or to arrange them relative to each other. The sequence is sometimes ordered and sometimes not. In a practical application of the process, the lists can take very different forms. In particular, they can be virtual lists, i.e. materialized only by indicators (markers or pointers) in larger sets (for example the catalogs of stars and doublets).

APPLICATION EXAMPLE

A star sensor is used in cartographic mode, i.e. it supplies the estimated magnitude of stars in its field of view and their estimated position in a spherical frame of reference tied to the sensor.

Of the sensed stars, the ten stars having the greatest magnitudes are retained as detected stars.

A three-dimensional doublet characterization space is defined, whose axes are respectively relative to the angular distance, the difference between and the sum of the magnitudes of the two stars of a doublet. A doublet is therefore represented within this space by a point, whether it is a detected doublet (corresponding to a pair of detected stars) or a likely doublet (i.e. a doublet from the catalog).

For each of the detected doublets, all doublets which within an ellipsoid in the doublet characterization space centered on the detected doublet in question are extracted from the previously created catalog of doublets.

Consider, for example, the ellipsoid defined by the following values:

0.003 radian for the major half-axis relating to the angular distance, 1.25 for the major half-axis relating to the sum of the magnitudes, and 1.25 for the major half-axis relating to the difference between the magnitudes.

The extracted doublets are integrated into the "list of likely doublets".

A classification and purging operation is then conducted on the basis of Table I above.

The purging criterion is therefore expressed in the following manner: a likely star is eliminated if the number of likely doublets in which it is present is less than a fixed value, depending from the second episode onwards on the number of stars in the class. After the first classification following the first episode, the recursive classification-purging process described above is applied. After an initializing classification, Table I is used again.

During these operations, any class for which the number of stars is less than or equal to 3 is eliminated.

Matching is then attempted for each of the stars for all of the classes in succession, using the method described above. In each class, the matching operations are stopped when the number of matched stars is greater than 5.

At the end of processing each class, the a posteriori confidence index defined below is calculated for class j:

$$\text{Confidence}(j) = (ht(3.0\ N_j))^{1.0}\ [T_j]^{2.0}\ (\theta_j)^{3.0}$$

$N_j$ is the number of stars in the class, $T_j$ is the connection rate of the class, $\theta_j$ is the star matching rate in the class (the number of matched stars divided by the total number) and ht denotes the hyperbolic tangent.

The class with the highest confidence factor is identified. If that factor is less than 0.03 or if inconsistencies are noted during matching, the process does not produce any pair of matched stars. Otherwise, the process produces the list of pairs of matched stars of the class concerned.

The invention is not limited to the embodiments described and many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A method of recognizing stars by comparing sensed stars defined by a star sensor from signals received from the sky and stars from a predefined catalog of stars, for a processing system using the star recognition, wherein calculation means are employed to perform the following operations:

applying a selection criterion to select some stars from the sensed stars, the stars selected in this way being referred to as detected stars;

matching the detected stars in pairs of stars referred to as detected doublets;

matching the stars from the catalog in pairs of stars referred to as catalogue doublets;

representing the catalogue doublets and the detected doublets in a characterization mathematical space to enable them to be compared;

marking in that space the catalogue doublets referred to as likely doublets which, in that space, are in a certain vicinity of the detected doublets;

creating matched pairs each comprising a star from a likely doublet referred to as a likely star and a detected star, and supplying to the processing system at least one list of matched pairs, characterized in that the calculating means are used to perform the following operations:

grouping the stars from the likely doublets into classes, deeming two stars to belong to the same class if and only if the two stars are one and the same star or there is a path linking them, a path being a series of likely doublets such that any pair of consecutive doublets of the series has at least one star in common, and constructing lists so that the likely stars of the same list are the likely stars of the matched pairs of the same class.

2. A method according to claim 1 wherein the coordinates of a doublet in the characterization space comprise the absolute value of the difference between the magnitudes of the two stars of the doublet.

3. A method according to claim 1 wherein constituting a class starts with a current star belonging to a likely doublet and all the stars which are linked to it by at least one path are integrated into the class, reiterating thereafter or recursively the same operation on the basis of said linked stars taken as current stars, and continuing in this way until all the likely doublets and likely stars reached progressively have been processed.

4. A method according to claim 1 wherein the stars of the likely doublets are subject to purging leading to some of them being eliminated.

5. A method according to claim 4 wherein the purging is effected by means of a succession of episodes is defined by a table of episodes, each episode comprising a pass or a set of passes, each pass consisting in retaining in or eliminating from the group of stars being purged those which satisfy the same purging criterion throughout the episode.

6. A method according to claim 5 wherein the group of stars being processed is classified after certain episodes or before the first episode.

7. A method according to claim 6 wherein the properties of a class, such as the number of stars in it or the number of doublets in it, are used to calculate the purging criterion applied to the stars of that class.

8. A method according to claim 6 wherein during a pass stars for which the number of links with the other stars is less than a threshold depending on the number of stars in the last class to which the star belonged after classification are eliminated.

9. A method according to claim 6 wherein if a classification performed after an episode leads to the creation of more than one class, the first episode from a new table of episodes is applied to the resulting classes, that table being identical to the preceding table or determined by the number of classifications to which the stars concerned have already been subjected.

10. A method according claim 6 wherein the next series of episodes not separated by classifications in the current table of episodes is applied to all the classes from the preceding episode, after which the remaining stars in all the classes are grouped together and a new classification is performed.

11. A method according to claim 6 wherein the next series of episodes not separated by classifications in the current table of episodes is applied for each of the classes from the preceding episode, classification is performed independently for each of the groups of stars from the preceding classes, and these classes are grouped together.

12. A method according claim 6 wherein after each classification each class is processed in succession until the final classes are produced before moving onto the next class.

13. A method according claim 1 wherein classes for which the number of stars is less than a predetermined threshold are eliminated.

14. A method according claim 1 wherein matching is performed by processing in succession the stars from the catalog belonging to the class concerned and for the current star $e_p$ a list LDD is created of the detected doublets which are the origin of the likely doublets containing that star and the detected star $ê_d$ which is encountered most often in the list of detected doublets is chosen for matching with the star $e_p$.

15. A method according to claim 14 wherein matching is not done if the difference between the numbers of encounters with the second most often encountered star and with $ê_d$ is less than a limit value depending on the characteristics of the class, such as the number of stars in it.

16. A method according claim 1 in which an a priori confidence value associated with each class is calculated.

17. A method according claim 1 wherein an a posteriori confidence value associated with each class is calculated and the selection of the classes for which pairs of matched stars are produced is based on it.

18. A method according to claim 16 wherein the a priori confidence value or the a posteriori confidence value comprises one or more of the terms of the group consisting of terms based on the number of stars in the class, the hyperbolic tangent of the number of stars multiplied by a constant $\beta$, the whole raised to a power d, and the criteria based on the connection rate of the class raised to a power a.

19. A method according to claim 18 wherein the a priori confidence values include a term comprising the products of at least some of the factors enumerated in claim 18.

20. A method according to claim 1 wherein a class whose a priori confidence value is less than a limit is eliminated before matching.

21. A method according to claim 17 wherein the a posteriori confidence value is based on the matched pair rate raised to a power $\gamma$ or a term dependent on inconsistencies encountered during matching.

22. A method according to claim 18 wherein the a posteriori confidence value includes a term comprising the product of at least some of the factors enumerated in claim 18.

23. A method according claim 1 wherein said recognition user processing system is not supplied with the list of matched stars corresponding to a class for which at least one inconsistency has been detected, or it is supplied with an inconsistency indication.

24. A method according to claim 1 wherein the classes are processed in decreasing order of a priori confidence value, the processing of the classes is stopped as soon as the a posteriori confidence value of a predetermined number of them exceeds a threshold value, and the recognition user system is supplied with the corresponding list or lists of pairs of matched stars.

25. A method according to claim 1 wherein the recognition user processing system is sent a predefined number of lists of pairs of matched stars corresponding to the classes for which the confidence value is the highest in decreasing order of that confidence value or accompanied by that value.

26. A method according to claim 1 wherein a pair is deleted from a list of pairs of matched stars such that, for a number of other pairs which exceeds a limit value that can depend on the number of pairs, the difference between the detected doublet and the likely doublet separating said pair and the other pair is greater than a threshold value in a doublet characterization space.

27. Application of a method according to claim 1 to determining the attitude of the sensor or of the vehicle carrying the sensor.

28. A method according to claim 1 wherein a class whose a posteriori confidence value is less than a limit is eliminated after matching.

* * * * *

UNITED STATES PATENT AND TRADEMARK OFFICE
CERTIFICATE OF CORRECTION

PATENT NO. : 6,324,475 B1
DATED : November 27, 2001
INVENTOR(S) : Serge Potteck

Page 1 of 1

It is certified that error appears in the above-identified patent and that said Letters Patent is hereby corrected as shown below:

<u>Column 2,</u>
Line 28, "Embodiments" should read -- Embodiment --.

<u>Column 6,</u>
Line 48, "otherwise" should read -- Otherwise --.

<u>Column 12,</u>
Lines 32, 37, 43, 46, 49, 62 and 64, after "according" insert -- to --.

<u>Column 13,</u>
Line 22, after "according" insert -- to --.

Signed and Sealed this

Seventh Day of May, 2002

*Attest:*

*Attesting Officer*

JAMES E. ROGAN
*Director of the United States Patent and Trademark Office*